United States Patent [19]

Hansen

[11] 4,115,136

[45] Sep. 19, 1978

[54] METHOD OF HEAT TREATING RAW MATERIALS AND ROTARY KILN PLANT THEREFOR

[75] Inventor: Dan S. Hansen, Copenhagen, Denmark

[73] Assignee: F. L. Smidth & Co., Cresskill, N.J.

[21] Appl. No.: 673,807

[22] Filed: Apr. 5, 1976

[30] Foreign Application Priority Data

Apr. 4, 1975 [GB] United Kingdom ............... 13889/75

[51] Int. Cl.[2] .............................................. C04B 7/44

[52] U.S. Cl. .................................... 106/100; 106/103; 432/106

[58] Field of Search ................................ 106/100, 103

[56] References Cited

U.S. PATENT DOCUMENTS

| | | | |
|---|---|---|---|
| 3,212,764 | 10/1965 | Muller et al. | 106/100 |
| 3,692,287 | 9/1972 | Kohl et al. | 106/100 |
| 3,887,388 | 6/1975 | Christiansen | 106/100 |
| 3,923,536 | 12/1975 | Kobayashi | 106/100 |
| 4,043,746 | 8/1977 | Ritzmann | 106/100 X |

FOREIGN PATENT DOCUMENTS 1,187,036 4/1970 United Kingdom.

OTHER PUBLICATIONS

Kirk-Othmer-Encyclopedia of Chemical Technology-2nd ed. vol. 4, p. 785 and vol. 10, pp. 292-293.

*Primary Examiner*—Helen M. McCarthy
*Attorney, Agent, or Firm*—Pennie & Edmonds

[57] ABSTRACT

A method is disclosed for burning alkaline raw materials in an inventive rotary kiln plant. According to the method, cold atmospheric air is introduced tangentially into a circular chamber mounted either within, or adjacent to, the raw material inlet end of the kiln such that a circulating stream of cold air is produced in the chamber around a stream of exhaust gases passing from the kiln to the chamber. A part of the exhaust gases are thereby cooled by the cold air, and alkali vapors therein are condensed out of, and onto, dust particles in the exhaust gases. The alkaline-coated dust particles are thus subsequently discharged from the chamber. The invention also relates to a rotary kiln plant for practicing the inventive method.

4 Claims, 4 Drawing Figures

METHOD OF HEAT TREATING RAW MATERIALS AND ROTARY KILN PLANT THEREFOR

BACKGROUND OF THE INVENTION

1. Field of the Invention

This invention relates to improvements in heat treating alkaline raw materials in a kiln. In particular, a rotary kiln plant and process are disclosed for burning cement raw materal.

2. Description of the Prior Art

Alkaline substances are often present in raw materials used in the manufacture of cement. In rotary kiln plants for such manufacture, the manufacturing process often includes a step of preheating of the raw materials in a preheater which receives its heat from the exhaust gases from the kiln. This enables a reduction in the processes taking place in the kiln itself, so that the kiln dimensions can be equally reduced.

The exhaust gases developed in the kiln often contain alkali vapours, which for example may be in the form of sulphates and carbonates. These vapours are expelled from the kiln and are condensed on passage through the preheater with the consequent formation of cakings and accumulations of the alkaline substances on the walls and in the various stages of the preheater. Such formations often necessitate periodically stopping the operation of the entire plant for the purpose of cleaning the preheater and the connection between the kiln and the preheater.

Various ways of overcoming this problem have been tried in the past. One proposed method consists of causing a relatively early condensation of the alkaline vapours in the lowermost stages of the preheater, so that the vapours are precipitated on dust particles contained in the smoke gases and are returned as alkaline dust to the kiln. The alkaline dust is then passed out of the system through valve gates, cyclones or filters provided in or associated with the preheater. However, this method suffers from the drawback that it does not effectively prevent critical amounts of alkaline vapours from penetrating to the other stages of the preheater.

Another known method is to remove part of the exhaust gases from the kiln before these gases are expelled through the kiln inlet, causing the gases thus removed to bypass the preheater and to go directly to an independent cleaning process. Together with the exhaust gases a corresponding amount of alkaline vapours are removed, and these alkaline vapours are thereby kept fully away from the preheater. For example, the alkali vapours may be subjected to an independent condensation process before they are returned as alkaline dust to the kiln or they are passed to a filter and/or valve gate. However, this method suffers from the drawback that the full effect of the preheater is not utilized because all the exhaust gases are not fed to the preheater.

A third method is known from British patent specification No. 1,187,036, in which alkaline dust is removed from a point near the inlet of the rotary kiln. In this process, the seal between the rotary kiln and the smoke chamber or the riser pipe at the inlet end is utilized such that a minor amount of false air is drawn into the smoke chamber through the seal and used for cooling subsequent condensation of the alkaline vapours contained in the exhaust gases. A part of the alkaline dust may then be removed through valve gates or a dust outlet directly beneath the inlet of the rotary kiln so that it is not passed up into the preheater. However, this method does not ensure that no alkali vapours are passed up into the preheater. Thus cakings and cloggings are not prevented.

Other methods of eliminating alkalies in such cement producing processes are disclosed in British Patent No. 1,322,313; U.S. Pat. No. 3,212,764 to Muller et al. (which corresponds to German Patent Publication No. 1,126,306); and U.S. Pat. No. 3,547,417 to Elkjaer. While these developments have improved the process of elimination of alkalies from cement producing systems, they have not proven to satisfactorily eliminate the alkalies while avoiding the drawbacks previously described. I have invented a method and a plant which increase the possibilities of condensing the alkali vapours directly at the inlet of a rotary kiln, such that the alkalies are converted into solids as dust that can be passed out of the system without involving cakings in the system.

SUMMARY OF THE INVENTION

A method is disclosed for heat treating alkaline raw materials in a heating means such as a kiln comprising directing a stream of exhaust gases from the heating means into a chamber communicating with the material inlet portion of the heating means, introducing a relatively cool gaseous medium into the chamber in a manner to produce cooling of at least portions of the gases and condensing of alkali vapours to form alkaline substances, and discharging from the chamber, the alkaline substances. In the embodiment disclosed, cement raw meal is burned in a rotary kiln and the dust laden exhaust gases of the kiln are directed to a circular mixing chamber positioned adjacent the material inlet of the kiln. Cold atmospheric air is injected into the circular chamber in a manner to form a circulating stream of cold air around a stream of exhaust gases passing from the kiln to the chamber, whereby a part of the exhaust gases are cooled and alkali vapours therein are condensed out of, and onto the dust particles in the exhaust gases. The thus alkaline-coated dust particles are subsequently discharged from the chamber.

Cold atmospheric air may be introduced into the chamber through at least one nozzle mounted tangentially in the wall of the chamber and/or through a labyrinth seal between chamber and kiln.

The invention also relates to a plant for heat treating alkaline raw material according to the inventive method. The plant comprises heating means such as a kiln for heat treating the raw material, the heating means having a material inlet portion. A chamber is positioned in communicating relation with the material inlet portion of the kiln and arranged to receive hot gases exiting from the kiln. The invention further comprises means for introducing a relatively cool gaseous medium into the chamber in a manner that alkali vapours contained in the exit gases are condensed for removal with the exhaust gases. A rotary kiln plant has a rotary kiln and a circular mixing chamber forming a part of, or connected in adjacent relation to, the material inlet of the kiln. One or more openings are provided in the wall of the mixing chamber for the introduction of cold atmospheric air with means for introducing cold atmospheric air into the chamber through the opening or openings. Generally, the alkali vapours will condense onto dust particles in the exhaust gases, and these alkaline substances will be removed with the exhaust gases.

The chamber may be provided with an automatic regulating mechanism to ensure the desired temperature of the mix, since it is of particular importance that the desired temperature is maintained along the wall of the mixing chamber and along the wall of the riser pipe or the smoke chamber directly after the mixing chamber where the risk of alkali cakings is high.

If the mixing chamber is provided inside the kiln, it may additionally be provided with an air nozzle for injecting cold air into the edge of the wall of the chamber facing the kiln so as to eliminate caking on that edge which is not touched by the air injected or sucked tangentially into the mixing chamber.

The mixing chamber may also be provided as an independent unit on the outer side of the inlet end of the rotary kiln, by which the chamber will also constitute the seal between the kiln and a following riser pipe or smoke chamber. To further ensure that the tangentially injected air forms eddies along the wall of the chamber, the chamber may be fitted with a number of inside baffles for guiding the air flow.

An essential feature of the invention is thus that a cold "tube" of circulating air is formed by the tangential injection of air into the mixing chamber and eddies produced along the walls of the chamber and the parts of the plant following the chamber in the direction towards the preheater. The eddies — or the cold layer constituted by the "tube" of air — produce condensation of the alkali vapours, and the alkali vapours are generally condensed onto the dust particles contained in the exhaust gases and passed out of the system as alkali dust.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
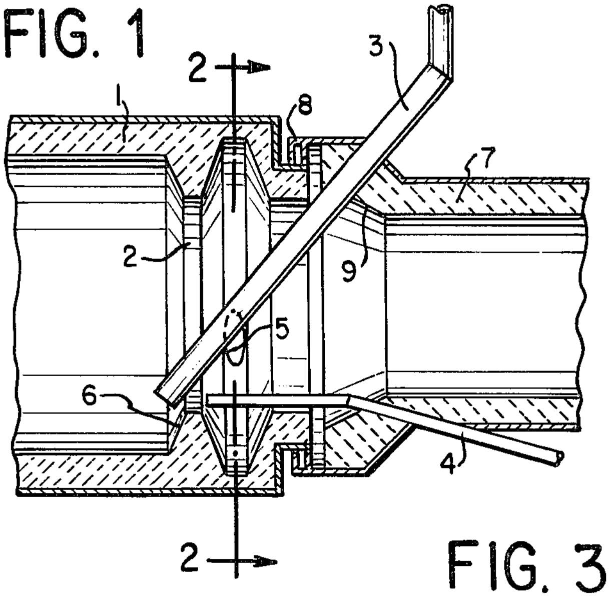
FIG. 1 is a cross-sectional view of the material inlet end of a rotary kiln and an adjacent mixing chamber according to the invention.
Figure 2:
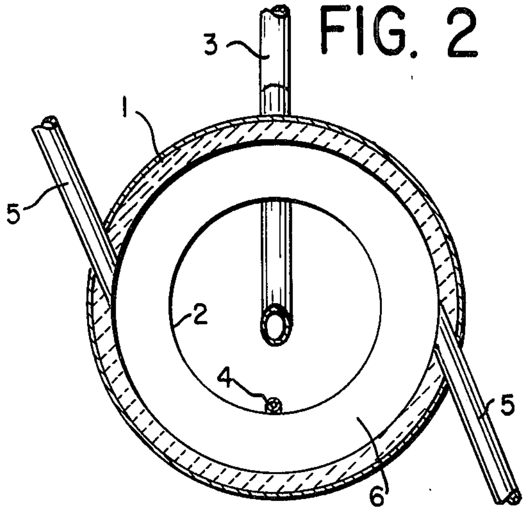
FIG. 2 is a cross-sectional view taken along lines 2—2 of FIG. 1.

Referring initially to FIGS. 1 and 2, there is illustrated the inlet end 1 of a rotary kiln. The kiln has a circular mixing or eddy chamber 2 provided in the material inlet end. A pipe 3 feeds material to the kiln, for example from the preheater, and the end of a riser pipe 7 is attached to the kiln inlet by means of a labyrinth seal 8. Nozzles 5, for introducing cold atmospheric air by injection or suction, are mounted tangentially in the wall of the chamber 2.

An annular wall 6 of the mixing chamber 2 faces the kiln and an air nozzle 4 injects cold air onto the generally radially extending inner surface of the annular wall 6 to prevent cakings of alkali on surface portions of the wall which are not touched by the stream of air introduced through the nozzles 5. Owing to the eddies produced in the chamber 2 by the stream of cold air introduced by injection or suction through the nozzles 5, the hot exhaust or smoke gases expelled through the inlet end of the kiln will be surrounded by a "tube" of cold air along the wall of the chamber. Owing to the direction and velocity of the exhaust gases, the cold air "tube" will extend into the riser pipe 7 along its wall.

On meeting the cold "tube" of air, the alkali vapours in the gases will be condensed and precipitated onto the dust particles of the exhaust gases. The dust particles may then be passed out of the system in known manner, such as by means of dust precipitators, filters, etc. Thus, the risk of cakings on the internal wall portions caused by the alkali vapours is substantially reduced.

The riser pipe 7 has an inside chamfering 9 on its inner side adjacent to the seal 8, and this chamfering contributes to the drawing of cold air which enters through the seal 8, into a slipstream of cold air to form a "tube" along the wall of the riser pipe.

Figure 3:
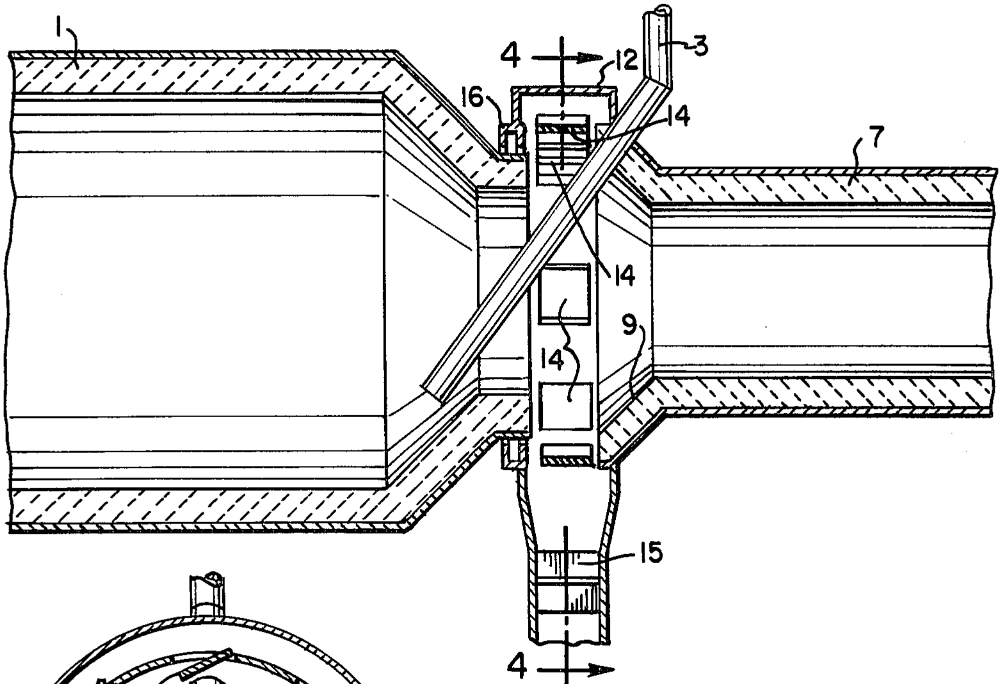
FIG. 3 is a cross-sectional view of a second embodiment of the invention.
Figure 4:
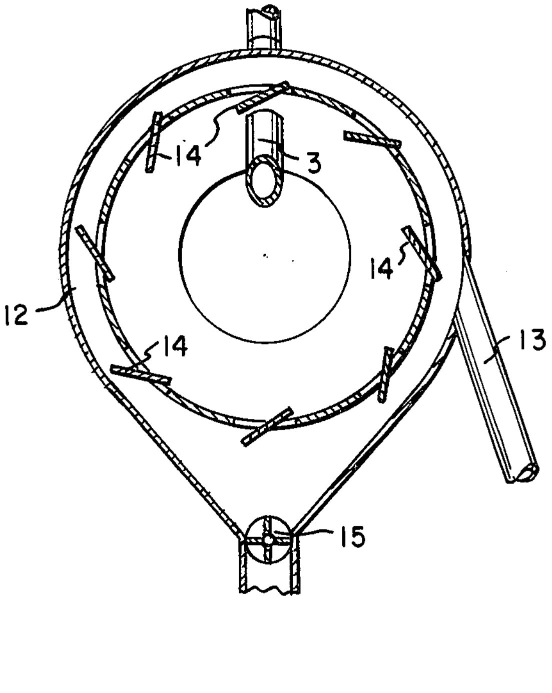
FIG. 4 is a cross-sectional view taken along lines 4—4 of FIG. 3.

In FIGS. 3 and 4 the mixing chamber 12 is provided on the material inlet end of the kiln 1. The chamber will be sealed to atmosphere by means of a seal 16 between the kiln and the riser pipe 7. In its preferred form, seal 16 is a labyrinth seal which is a fixed seal between the chamber 12 and riser pipe 7. A raw meal inlet 3 and an air nozzle 13 for introducing cold air into the chamber by injection or suction are provided, the air nozzle 13 being mounted tangentially in the wall of the chamber. Inside the chamber and approximately at its wall are mounted baffles 14 which guide the air stream introduced into the chamber and contribute to an effective formation of eddies in the chamber. A dust outlet 15 is provided in the bottom of the chamber for removal of precipitated alkaline dust.

I claim:

1. A method of burning cement raw meal containing alkaline substances in a rotary kiln plant wherein the kiln exhaust gases contain dust particles and alkali vapours, comprising:

(a) introducing the cement raw meal into the material inlet end portion of the rotary kiln;

(b) burning the cement raw meal in the kiln;

(c) directing the kiln exhaust gases into a generally circular chamber communicating directly with the material inlet end portion of the kiln;

(d) introducing relatively cold atmospheric air generally tangentially into the chamber in a manner to produce a circulating stream of relatively cold air generally about the stream of exhaust gases passing therethrough from the kiln whereby at least portions of the exhaust gases are cooled and alkali vapours are condensed out of the gases and onto dust particles entrained therein; and (e) permitting the alkali coated dust particles to be discharged from the chamber.

2. The method according to claim 1 further comprising selectively introducing relatively cold atmospheric air into the chamber through at least one opening defined by the outer wall portion thereof in a manner to selectively regulate the ratio of relatively cold air to relatively hot exhaust gases in the chamber so as to obtain a predetermined desired temperature of the mixture sufficient to condense the alkali vapours in the chamber.

3. A method of burning cement raw meal containing alkaline substances in a rotary kiln plant wherein the kiln exhaust gases contain dust particles and alkali vapours, comprising:

(a) introducing the cement raw meal into the material inlet end of the rotary kiln;

(b) burning the cement raw meal in the kiln;

(c) directing the kiln exhaust gases laden with alkali vapours into a generally circular chamber communicating directly with the raw material inlet end of the kiln;

(d) selectively injecting relatively cold atmospheric air through at least one air nozzle generally tangentially into the chamber so as to produce a circulating stream of relatively cold air generally about the stream of exhaust gases passing therethrough from the kiln whereby at least portions of the exhaust gases are cooled and alkali vapours are condensed out of the gases and onto the particles of dust entrained in the gases; and e. discharging at least part of the dust particles coated with alkaline substances directly from the chamber.

4. A method of burning cement raw meal containing alkaline substances in a rotary kiln plant wherein the kiln exhaust gases contain dust particles and alkali vapours, comprising:

(a) introducing the cement raw meal into the material inlet end of the rotary kiln;

(b) burning the cement raw meal in the kiln;

(c) directing the kiln exhaust gases laden with alkali vapours into a generally circular chamber communicating directly with the material inlet end portion of the kiln;

(d) introducing relatively cold atmospheric air generally tangentially into the chamber so as to provide a circulating stream of relatively cold air generally about the stream of exhaust gases passing therethrough from the kiln whereby at least portions of the exhaust gases are cooled and alkali vapours are condensed out of the gases onto dust particles entrained therein;

(e) discharging the gases and alkali coated dust particles from the chamber; and (f) separating the alkali coated dust particles from the gases.

* * * * *

UNITED STATES PATENT AND TRADEMARK OFFICE

CERTIFICATE OF CORRECTION

PATENT NO. : 4,115,136

DATED : September 19, 1978

INVENTOR(S) : Dan S. Hansen

It is certified that error appears in the above-identified patent and that said Letters Patent are hereby corrected as shown below:

Column 1, line 11 "materal" should read
-- material --

Column 3, line 12, "into the edge" should read
-- onto the edge --

Signed and Sealed this

*Twentieth* Day of *March 1979*

[SEAL]

*Attest:*

RUTH C. MASON
*Attesting Officer*

DONALD W. BANNER
*Commissioner of Patents and Trademarks*